United States Patent
Kobayashi et al.

(10) Patent No.: US 7,568,071 B2
(45) Date of Patent: Jul. 28, 2009

(54) DATA-CACHE APPARATUS AND A DATA-CACHE METHOD USED BY A RADIO COMMUNICATIONS SYSTEM

(75) Inventors: Kazunari Kobayashi, Kawasaki (JP); Tomonori Kumagai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 327 days.

(21) Appl. No.: 11/082,961

(22) Filed: Mar. 18, 2005

(65) Prior Publication Data

US 2006/0117139 A1 Jun. 1, 2006

(30) Foreign Application Priority Data

Nov. 29, 2004 (JP) ............................. 2004-343350

(51) Int. Cl.
*G06F 12/00* (2006.01)
*G06F 15/16* (2006.01)

(52) U.S. Cl. .................. 711/126; 709/203; 709/217; 709/219; 709/228; 709/250; 711/118

(58) Field of Classification Search ................ 711/126, 711/118; 709/203, 217, 219, 228, 250
See application file for complete search history.

(56) References Cited

U.S. PATENT DOCUMENTS

| | | | |
|---|---|---|---|
| 2004/0116139 A1 | 6/2004 | Yi et al. | |
| 2005/0089011 A1* | 4/2005 | Bender | 370/349 |
| 2007/0202865 A1* | 8/2007 | Moride | 455/419 |

FOREIGN PATENT DOCUMENTS

| | | |
|---|---|---|
| EP | 1059763 | 12/2000 |
| EP | 1227637 | 7/2002 |
| JP | 8-213984 | 8/1996 |
| JP | 2000-250803 | 9/2000 |
| JP | 2000-276425 | 10/2000 |

* cited by examiner

*Primary Examiner*—Hyung S Sough
*Assistant Examiner*—Mehdi Namazi
(74) *Attorney, Agent, or Firm*—Hanify & King, P.C.

(57) ABSTRACT

A data-cache apparatus for providing a data-cache function to a radio communications system is disclosed. The data-cache apparatus includes a data distinguishing unit (310) to distinguish an attribute of data requested by a mobile station, a cache memory (340) that temporarily stores data provided to a mobile station, and a data request processing unit (320 and 330) to acquire requested data from the cache memory or an external server based on a result of distinction carried out by the data distinguishing unit. The data request processing unit performs operations of searching for the requested data in the cache memory, and storing the acquired data in the cache memory.

12 Claims, 8 Drawing Sheets

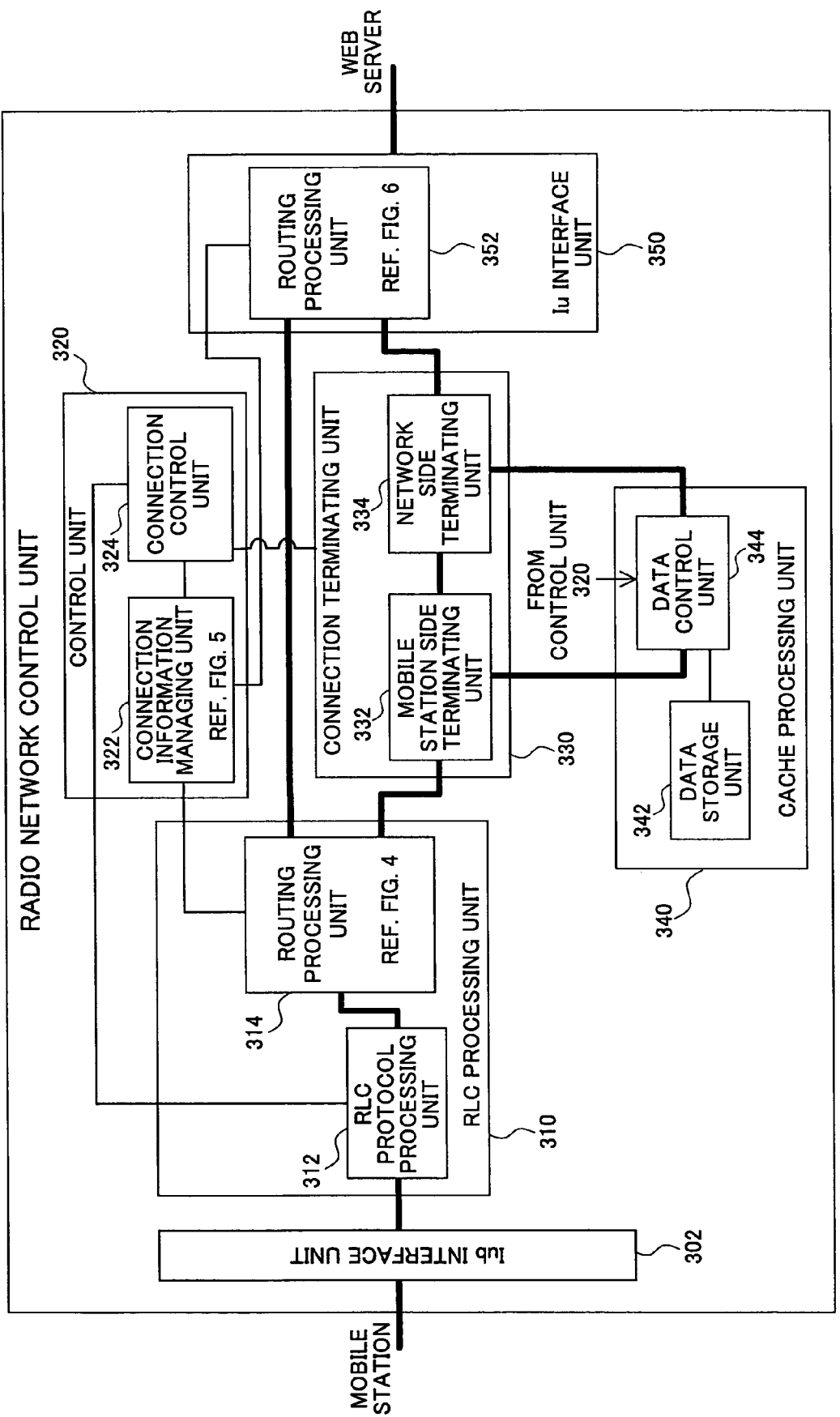

FIG.4

| RLC CONNECTION IDENTIFIER | KIND OF SERVICE | DESTINATION |
|---|---|---|
| RLC_ID#0 | PACKET | CONNECTION TERMINATING UNIT |
| RLC_ID#2 | NON TARGET | Iu INTERFACE UNIT |
| ⋮ | ⋮ | ⋮ |

FIG.5

| MOBILE STATION IDENTIFIER | KIND OF SERVICE | RLC CHANNEL |
|---|---|---|
| ID#0 | PACKET | 1: AM WITH CACHE<br>2: AM WITHOUT CACHE<br>3: UM |
| ID#2 | NON TARGET | — |
| ⋮ | ⋮ | ⋮ |

FIG.6

| CONNECTION IDENTIFIER | KIND OF SERVICE | DESTINATION |
|---|---|---|
| Con_ID#0 | PACKET | CONNECTION TERMINATING UNIT |
| Con_ID#2 | NON TARGET | RLC PROCESSING UNIT |
| ⋮ | ⋮ | ⋮ |

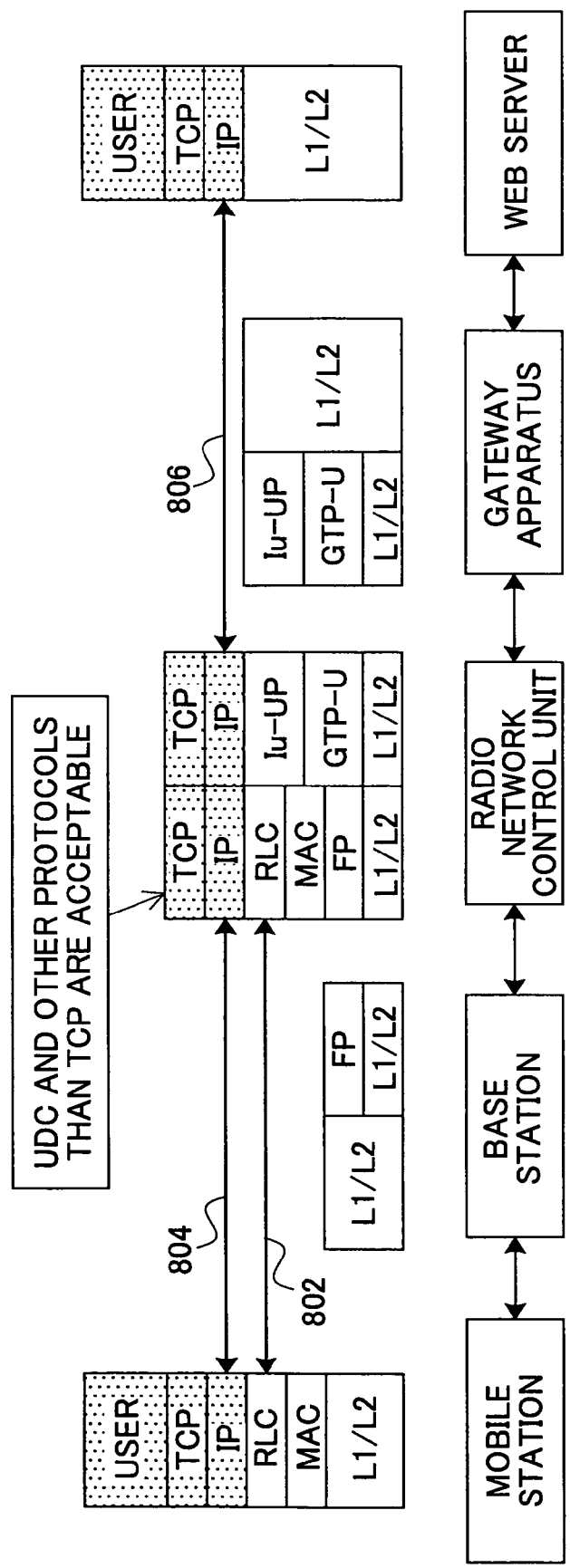

DATA-CACHE APPARATUS AND A DATA-CACHE METHOD USED BY A RADIO COMMUNICATIONS SYSTEM

BACKGROUND OF THE INVENTION

1. Field of the Invention

The present invention generally relates to radio communications, and especially relates to a data-cache apparatus and a data-cache method that are used by a radio communications system.

2. Description of the Related Art

Service contents of radio communication systems are increasingly diversified with progress of system development, which trend will continue. Not only mere voice communication services, but services of distributing still images and motion pictures are being offered. Under this situation, in order to provide a higher quality service, various specifications based on the wideband CDMA method (W-CDMA method) are set forth by the 3GPP (3rd Generation Partnership Project) that is a standardization organization for the third generation mobile communications systems.

FIG. 1 is an overview of a radio communications system of this kind. The radio communications system includes mobile stations 102, base stations 104 that communicate with the mobile stations 102, radio network control units (RNC) 106 that are connected to the base stations 104, a packet switching apparatus 108 that is connected to the radio network control units 106, a gateway apparatus 110 that is connected to the packet switching apparatus 108, and Web servers 112 that are connected to the gateway apparatus 110.

An interface between the mobile stations 102 and the base stations 104 is expressed by Uu. An interface between the base stations 104 and the radio network control units 106 is expressed by Iub. An interface between the radio network control units 106 is expressed by Iur. An interface between the radio network control units 106 and the packet switching apparatus 108 is expressed by Iu.

FIG. 2 shows an example of a protocol stack of a cellular communication system such as described above. Therein, TCP expresses a Transmission Control Protocol, IP expresses Internet Protocol, and RLC expresses a layer of a Radio Link Control unit. MAC expresses a layer of Media Access Control. L1/L2 expresses a physical layer. FP expresses a layer of Frame Protocol. GTP-U expresses a GPRs Tunneling Protocol. USER expresses a process peculiar to a user performed on the user side.

When the mobile station 102 of FIG. 1 acquires data from a certain Web server 112 using a packet communication service, generally, the following process is performed. First, an RLC connection 202 for performing data transmission via a radio channel is set up. An RLC protocol is a protocol for ascertaining correctness of data in a radio transmission path, etc., and mainly deals with resending control, etc. The RLC protocol has three modes of operation, namely, a resend mode (AM: Acknowledge Mode), a non-resending mode (UM: Unacknowledge Mode), and a transparent mode (TrM: Transparent Mode). When resending of data is actually performed, the resend mode (AM) is operated. Further, in the RLC protocol, for example, two or more logical channels are prepared to one protocol entity of one user, and the modes of operation can be individually assigned to each user by selecting the logical channels.

When an RLC connection is established between the mobile station 102 and the radio network control unit 106, a TCP/IP connection 204 is set up between the mobile station 102 and the Web server 112. In the TCP protocol, ascertaining the correctness of data such as a resending control is carried out as in the RLC protocol. Generally, the resending control of the TCP protocol handles a greater data size of data to resend, and is performed by a simpler process as compared with the radio resending control of the RLC protocol. When the TCP/IP connection is established between the mobile station 102 and the Web server 112, the radio network control unit 106 simply relays the data transmission between the mobile station 102 and the Web server 112. Under this situation, the mobile station 102 requests desired data of the Web server 112, and in response to the request, the Web server 112 provides the requested data.

The data request and distribution of the requested data are carried out by "USER" of FIG. 2. Specifically, it is common that it is carried out by HTTP (Hyper Text Transport Protocol) that operates on the TCP/IP. Further, while it is common to use HTML (Hyperlink Text Markup Language) as a description language, the language of cHTML (Compact HTML), WML (Wireless Markup Language), and others may be used.

Traffic of the data distribution service provided between the mobile stations and the Web servers will increasingly become great as the contents of service become diversified from now on, with an increase in the amount of data and an increase in the number of subscribers being added, and processing burden of the data distribution on the network side and service providers will become great. This will cause, for example, remarkable delays in data transmission. One method of solving this kind of problem can be to increase capacity of the Web server and others, preparing for the increased traffic. However, such new investment is a burden not only to the service providers, but also to the users since communication charges will have to be raised.

It is conceivable that the traffic burden of the network may be reduced if a data-cache function is provided to a relay node, since repetitive transmissions of the same data from the Web server to the mobile station can be avoided. However, no technology for providing the data-cache function to a radio communications system, such as 3GPP, has been reported. Data caching in systems other than 3GPP is disclosed, for example, by Patent Reference 1.

[Patent Reference 1] JPA, 2000-250803

If the conventional data cache is applied to the relay node such as the radio network control unit in an attempt to provide a data cache function to the radio communications system, there are problems. That is, since the radio network control unit only relays data as described above, all the data that pass through the radio network control unit will be stored by a cache memory. The data provided to the mobile stations include data that would not be requested again henceforth, like voice data and real-time data (for example, data provided by audio-video AV services). That is, data not suitable for temporary storage will be stored in large volume. With the added data control burden, such technique as above, i.e., applying the conventional method to the radio communication environment, does not provide a realistic solution.

Further, the data exchanged between the mobile station and the Web server can include confidential data, the secrecy of which should be protected, and such confidential data should not be indiscriminately stored and made available again. Although a method may be thought of wherein whether certain data are appropriate for caching is determined by kinds of language, such as HTML, the method remarkably reduces the convenience of the communication system and the flexibility of a design.

SUMMARY OF THE INVENTION

The present invention is made in view of the problems described above, and aims at offering a data-cache apparatus and a method of providing an efficient data-cache function to a radio communications system, the data-cache apparatus and the data-cache method substantially obviating one or more of the problems caused by the limitations and disadvantages of the related art.

Features and advantages of the present invention are set forth in the description that follows, and in part will become apparent from the description and the accompanying drawings, or may be learned by practice of the invention according to the teachings provided in the description. Objects as well as other features and advantages of the present invention will be realized and attained by a data-cache apparatus and a data-cache method used by a radio communications system, which apparatus and method are particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides as follows.

The data-cache apparatus according to an aspect of the present invention includes a data distinguishing unit to distinguish an attribute of data requested by the mobile station, a cache memory that temporarily stores the data that is provided to the mobile station, and a data request processing unit to acquire requested data from one of the cache memory and an external server according to a result of distinction carried out by the data distinguishing unit. The data request processing unit searches the cache memory for the requested data, and stores the acquired data in the cache memory.

The radio network control unit, according to an aspect of the present invention, distinguishes an attribute of the data requested by the mobile station. If the attribute is determined to be a predetermined attribute, the requested data are searched for in the cache memory that stores data that have been provided to a mobile station in the past. If the requested data are found in the cache memory, the data are provided to the mobile station. Otherwise, if the attribute is determined not to be the predetermined attribute, and if it is determined that the cache memory does not store the requested data, the requested data are acquired from the external server, and provided to the mobile station. As described, the cache memory stores only data that have the predetermined attribute. The predetermined attribute is assigned when setting up an RLC communication with the mobile station.

Since the attribute of data requested by the mobile station is distinguished and the data are cached depending on the distinction result, only data having a high probability of being used again are stored, and an efficient data-cache function is offered. In this manner, a data distribution service that is economical and efficient can be provided. Further, the burden on the side of the service provider concerning the data distribution is mitigated without notably increasing plant-and-apparatus investments. Furthermore, since data are cached according to the attribute of the data, confidential data can be excluded from caching. Further, since it is not necessary to distinguish whether to cache by languages, the convenience of the communication system can be further raised.

According to an aspect of the present invention, acquisition of requested data from the cache memory or an external server, as applicable, is performed at the TCP/IP layer. Accordingly, contents of packet data can be distinguished, and whether the requested data are suitable for data caching can be determined.

According to another aspect of the present invention, distinction of the attribute of the data is performed at the RLC layer.

According to another aspect of the present invention, the data resending process between the mobile station and the data-cache apparatus is performed at one of the RLC layer and the TCP/IP layer.

According to another aspect of the present invention, the data resending process between the mobile station and the data-cache apparatus is performed at both the RLC layer and the TCP/IP layer. In this manner, the data transmission can be made highly reliable.

According to another aspect of the present invention, the data resending process between the mobile station and the data-cache apparatus is performed at one of the RLC layer and the TCP/IP layer depending on the radio communications environment.

According to another aspect of the present invention, the data request processing unit further includes a communication condition management unit to manage the communication conditions set up at the time of the communication connection between a mobile station and a radio network control unit. According to another aspect of the present invention, the communication conditions are set up by two or more logical channels used by the RLC protocol entity. In this manner, whether the data are to be cached, whether the security protection is necessary, etc., can be simply set up and managed for every mobile station.

According to another aspect of the present invention, the data-cache apparatus is provided to the radio network control unit. In this manner, the new plant-and-apparatus investment for realizing the function of the present invention can be kept low.

[Effect of the Invention]

According to the present invention, an efficient data-cache function can be provided to a radio communications system.

BRIEF DESCRIPTION OF THE DRAWINGS

FIG. 3 is a block diagram showing a radio network control unit according to an embodiment of the present invention;

FIG. 4 is a table showing an example of a table used at a routing process;

FIG. 5 is a table showing an example of a table for managing connection information of every mobile station;

FIG. 6 is a table showing an example of a table used at the routing process;

FIG. 7 is a block diagram showing the protocol stack according to the embodiment of the present invention;

DESCRIPTION OF THE PREFERRED EMBODIMENTS

Figure 1:
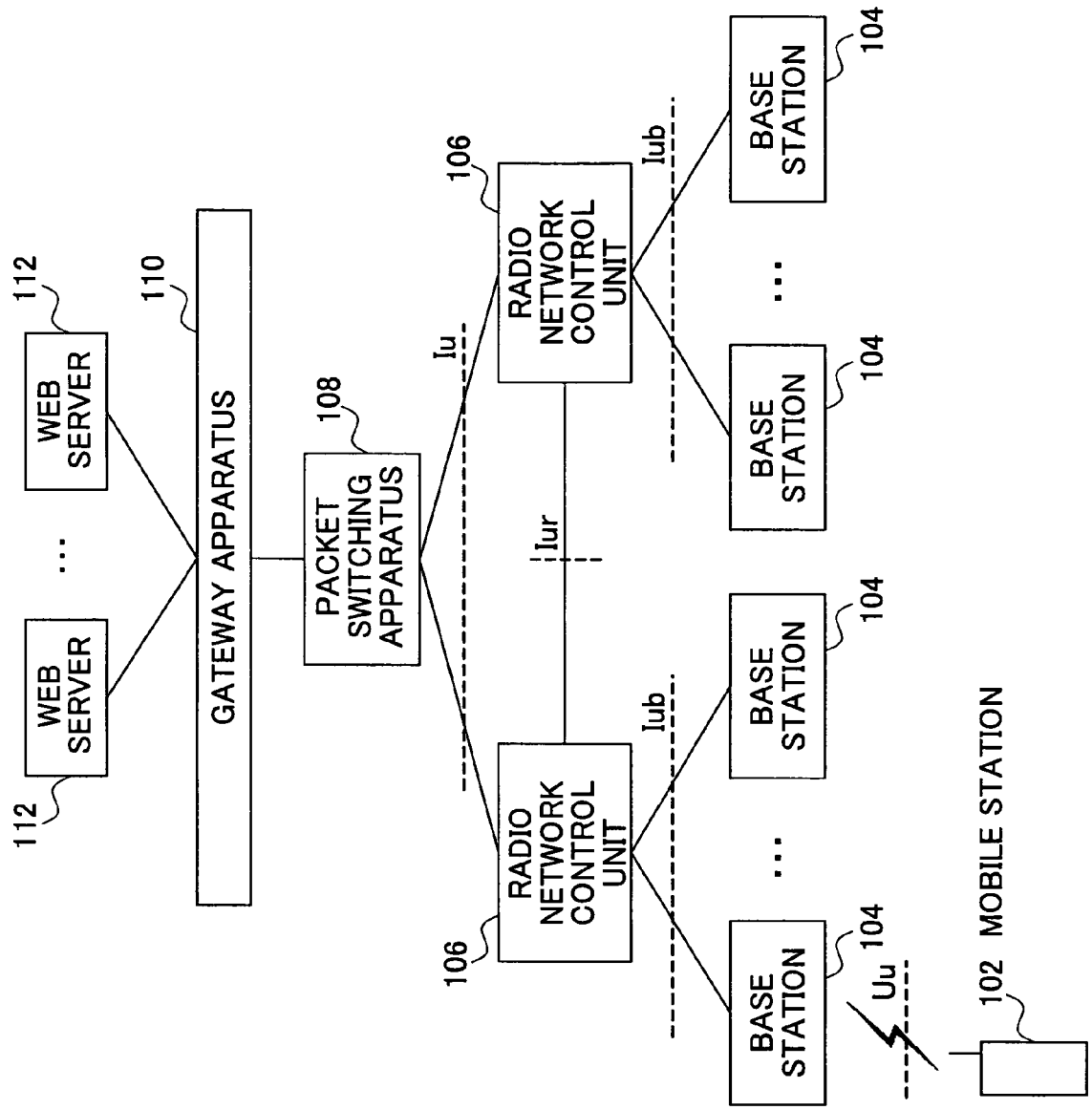
FIG. 1 is a block diagram showing an overview of a radio communications system.

In the following, embodiments of the present invention are described with reference to the accompanying drawings.

Embodiment 1

FIG. 3 is a block diagram showing functional units of a radio network control unit (RNC) 300 according to the embodiment of the present invention. In this functional block diagram, the main functions relevant to the present invention are roughly illustrated. Thick solid lines in FIG. 3 indicate transmission paths of packet data, and thin solid lines indicate transmission paths of a control signal. The radio network control unit 300, which is shown as 106 in FIG. 1, includes an Iub interface unit 302 that interfaces with a mobile station 102 (FIG. 1), an RLC processing unit 310, a control unit 320, a connection terminating unit 330, a cache processing unit 340, and an Iu interface unit 350 that interfaces with a Web server 112. The RLC processing unit 310 includes an RLC protocol processing unit 312, and a routing processing unit 314. The control unit 320 includes a connection information managing unit 322, and a connection control unit 324. The connection terminating unit 330 includes a mobile station side terminating unit 332, and a network side terminating unit 334. The cache processing unit 340 includes a data storage unit 342, and a data control unit 344. The Iu interface unit 350 includes a routing processing unit 352. The control unit 320 and the connection terminating unit 330 essentially constitute a "data request processing unit".

The Iub interface unit 302 on the side of the mobile station 102 is an interface for the radio network control unit 300 communicating with the mobile station 102 through a base station 104 (FIG. 1). The Iub interface unit 302 performs a process below the transport layer such as a process in the FP layer. By performing the process, for data requested by the mobile station 102, it is determined whether they are voice data or packet data, for example. The voice data are processed according to a conventional method, which is not illustrated. The packet data, other than the voice data, are processed by a process of the present invention as described below.

The RLC processing unit 310 performs processing at the RLC layer. When the RLC protocol processing unit 312 receives a data request from a mobile station, it distinguishes which logical channel is used among logical channels that are set up to the mobile station. A distinction result is provided to the control unit 320. According to the RLC protocol, a protocol entity corresponding to each of the mobile stations 102 that communicates performs a process, and the contents of the process are set up for every mobile station according to which logical channel is used. The contents of setting up a logical channel are decided when an RLC connection is set up between the mobile station 102 and the radio network control unit 300.

The routing processing unit 314 determines whether an access is made to the Iu interface unit 350 or the connection terminating unit 330 depending on the attribute of the packet data that the mobile station 102 requests. Generally, if the requested packet is likely cached, the request is routed to the connection terminating unit 330; otherwise, the request is routed to the Iu interface unit 350.

FIG. 4 shows an example of a table showing the setting contents to be performed by the routing processing unit 314. An RLC connection with a mobile station 102 that has an identifier ID#0 is expressed by RLC_ID#0, and the table indicates that a distribution service of packet data is offered by the connection, and that a data acquisition request should be provided to the connection terminating unit 330. An RLC connection with a mobile station 102 that has an identifier ID#2 is expressed by RLC_ID#2, and the table indicates "NON TARGET", which means that a data communication service unrelated to the data cache of the present invention is performed by the connection, and that the received data should be provided to the Iu interface unit 350.

Here, in this embodiment, the routing destination is determined by the routing processing unit 314 according to the setting contents of the logical channels; however, the routing destination, and the like may be determined by other methods. For example, the routing destination of packet data may be determined by a negotiation process performed by the RLC protocol. The setting contents by the RLC protocol and the RLC protocol for every user basically correspond to "communication conditions".

On the other hand, when the requested packet data are received from the Iu interface unit 350 or the connection terminating unit 330, as applicable, the RLC processing unit 310 of FIG. 3 transmits the packet data to the mobile station 102 according to the setting contents managed by the connection information managing unit 322.

The control unit 320 controls operations about the communication (connection) that the radio network control unit 300 performs. The connection information managing unit 322 manages a parameter about the connection with the mobile station.

FIG. 5 is a table showing an example of the information managed by the connection information managing unit 322. As shown in FIG. 5, service classification and logical channels (channels that RLC uses) are managed for every mobile station 102. The table reads that a mobile station 102 having an identifier ID#0 uses the packet data service, and may use logical channels 1 (with AM cache), 2 (with no AM cache), and 3 (UM). Data transported through the logical channel 1 are cache-able data such as image data of a public Web page. Data transported through the logical channel 2 are not cache-able data as such real-time data of an AV service, and image data of a private Web page displayed after a password input. Data through the logical channel 3 are transported without performing the resending control. Here, the correspondence relations between logical channels and modes of operations may differ from mobile station to mobile station. In FIG. 5, a mobile station 102 having an identifier ID#2 is communicating data other than packet data (for example, voice data), and the data are "not a target" of data caching.

The connection control unit 324 shown in FIG. 3 gives directions to the connection terminating unit 330 based on the kind of logical channel distinguished by the RLC protocol processing unit 312, and the correspondence relation of the logical channel managed by the connection information managing unit 322. The contents of directions are mainly whether to use the data-cache processing unit 340.

The connection terminating unit 330 performs a terminating process of the connections of the radio network control unit 300. The mobile station side terminating unit 332 performs a terminating process of the IP connection between the mobile station 102 and the radio network control unit 300. Then, additional information such as a header that accompanies the packet in the IP layer of the connection is decoded and updated (or substituted, as appropriate). The network side terminating unit 334 performs a terminating process between the radio network control unit 300 and the Web server 112. Then, additional information such as the header that accompanies the packet in the IP layer of the connection is decoded and updated (or substituted, as appropriate).

The cache processing unit 340 performs data cache operations. The data storage unit 342 temporarily stores the data packet that is provided to the mobile station 102. Although it is common that the stored data are those extracted from the Web server, the data may be those acquired from a mobile station 102. The data control unit 344 operates according to the directions from the control unit 320. If the data request from the mobile station 102 is received from the mobile station side terminating unit 332, the data control unit 344 searches the data storage unit 342, and determines whether the requested data are stored. If the data are stored in the data storage unit 342, that fact is reported, and the data are transmitted to the mobile station side terminating unit 332. If the requested data are not stored, a data acquisition request is transmitted to the network side terminating unit 334. Alternatively, the data control unit 344 may transmit the data acquisition request to the network side terminating unit 334.

On the other hand, if the data provided to a mobile station 102 are received from the network side terminating unit 334, the data control unit 344 stores the data in the data storage unit 342 according to the directions from the control unit 320. In this manner, public data can be stored, while confidential data are not stored according to the directions from the control unit 320. More generally, according to the contents of a communication setting for every user, the kinds of data to be stored in the data storage unit 342 can be decided.

The Iu interface unit 350 on the side of the Web server 112 is an interface for the radio network control unit 300 to communicate with a node on the network side. The Iu interface unit 350 also performs a process below the transport layer. The routing processing unit 352 transmits the data acquisition request from the routing processing unit 314 or the network side terminating unit 334 to the side of the Web server 112. Further, the routing processing unit 352 accesses the routing processing unit 314 or the connection terminating unit 330 according to the attribute of the packet data acquired from the web server. Generally, if an acquired packet is likely to be cached, the data are provided to the connection terminating unit 330, otherwise, the data are provided to the routing processing unit 314.

FIG. 6 is a table of setting contents of the routing processing unit 352. In FIG. 6, an IP connection to a mobile station 102 having an identifier ID#0 is shown by Con_ID#0, through which connection, a packet data distribution service is offered, and it is indicated that acquired data should be transmitted to the connection terminating unit 330. An RLC connection to a mobile station 102 having an identifier ID#2 is shown by Con_ID#2, through which connection, data communication unrelated to caching of the present invention is offered, and it is indicated that the received data should be transmitted to the RLC processing unit 310.

Figure 2:
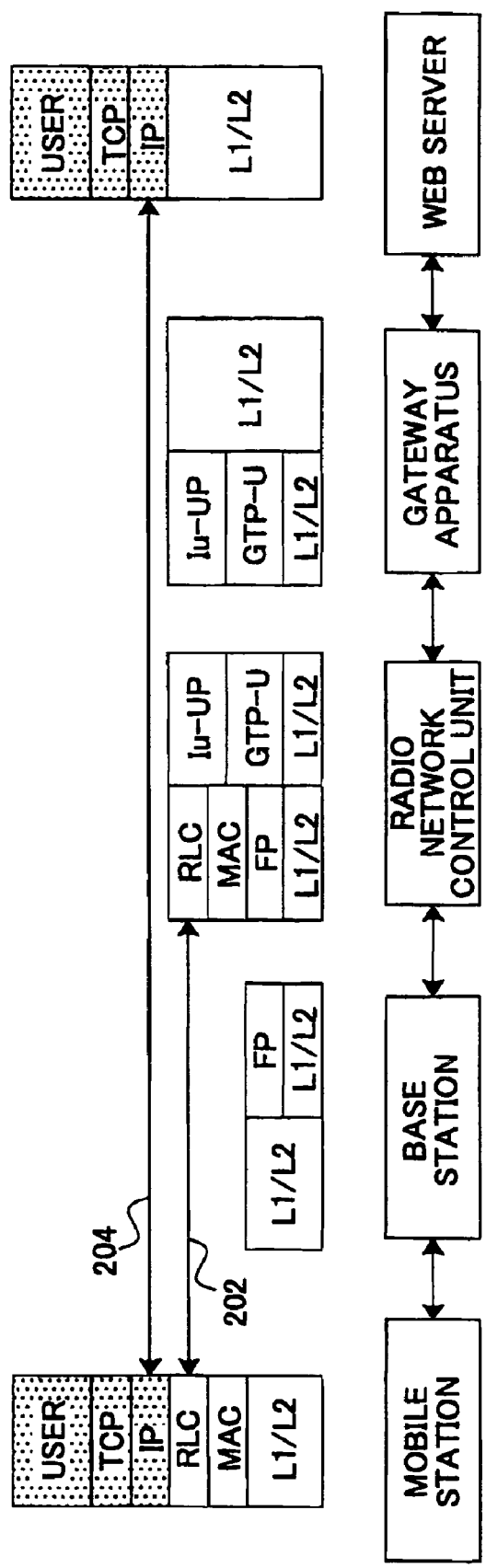
FIG. 2 is a block diagram showing a protocol stack of a conventional communication system.

FIG. 7 shows a protocol stack according to one of the embodiments of the present invention. Unlike the conventional protocol stack shown in FIG. 2, the function of the TCP/IP layer is prepared by the radio network control unit 300 according to this embodiment. This function is mainly performed by the control unit 320, the connection terminating unit 330, and the cache processing unit 340 of FIG. 3.

Figure 8:
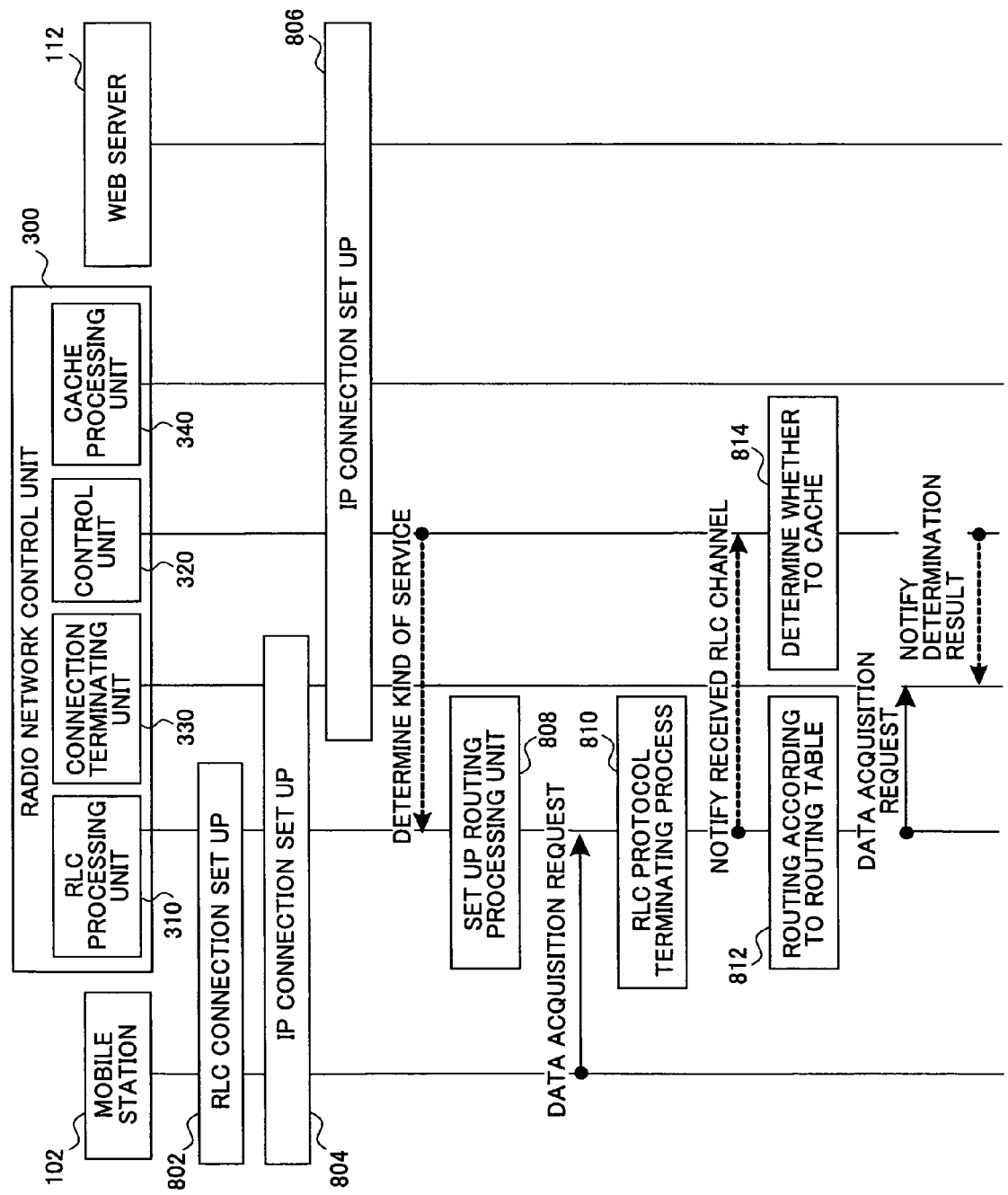
FIG. 8 is a sequence flowchart (No. 1) showing operations according to the embodiment of the present invention.

FIG. 8 is a sequence flowchart (part 1 of 2) that shows operations according to the embodiment of the present invention. First, operations until the mobile station 102 acquires the same data as the data stored in the Web server 112 are explained.

As shown in Step 802, an RLC connection is first set up between the mobile station 102 and the radio network control unit 300. The RLC connection includes a radio link between the mobile station 102 and the base station 104, and a cable link between the base station 104 and the radio network control unit 300. At Step 804, in response to the RLC connection being set up, an IP connection is set up between the mobile station 102 and the radio network control unit 300. At Step 806, in response to the RLC connection being set up, an IP connection is set up between the radio network control unit 300 and the Web server 112. The connections set up at Steps 802, 804, and 806 correspond to three bi-directional arrows as shown in the upper part of FIG. 7.

At Step 808, the control unit 320 sets up the routing destination of the routing processing unit 314 of the RLC processing unit 310 based on the contents of the logical channel set up to the RLC connection. The radio network control unit 300 distributes a data acquisition request from the mobile station 102 to a suitable entity through the Iub interface unit 302 and the RLC processing unit 310.

At Step 810, the radio network control unit 300 receives the data acquisition request from the mobile station 102, and determines the kind of logical channel currently used by the packet carrying the data acquisition request. Then, the terminating process (decoding, and replacement of a header, etc.) in the RLC layer is performed. The kind of the logical channel (receiving RLC channel) is communicated to the control unit 320.

At Step 812, the packet carrying the data acquisition request is transmitted to the routing processing unit 314, and then transmitted to the appropriate destination as shown in FIG. 4. In the example shown by FIG. 4, the data acquisition request of the mobile station 102 is routed to the mobile station side terminating unit 332 of the connection terminating unit 330.

At Step 814, the control unit 320 determines whether data cache is to be used based on the receiving RLC channel. For example, if the requested data are those of a public Web page, it is determined that the data are to be cached, and that effect is reported. Otherwise, if the requested data are of a secret nature, it is determined that the data cache should not be used, and that effect is reported. In the case that the data cache is to be used, a search request for the data that should be acquired is made to the data control unit 344 of the cache processing unit 340 from the mobile station side terminating unit 332 of the connection terminating unit 330.

Figure 9:
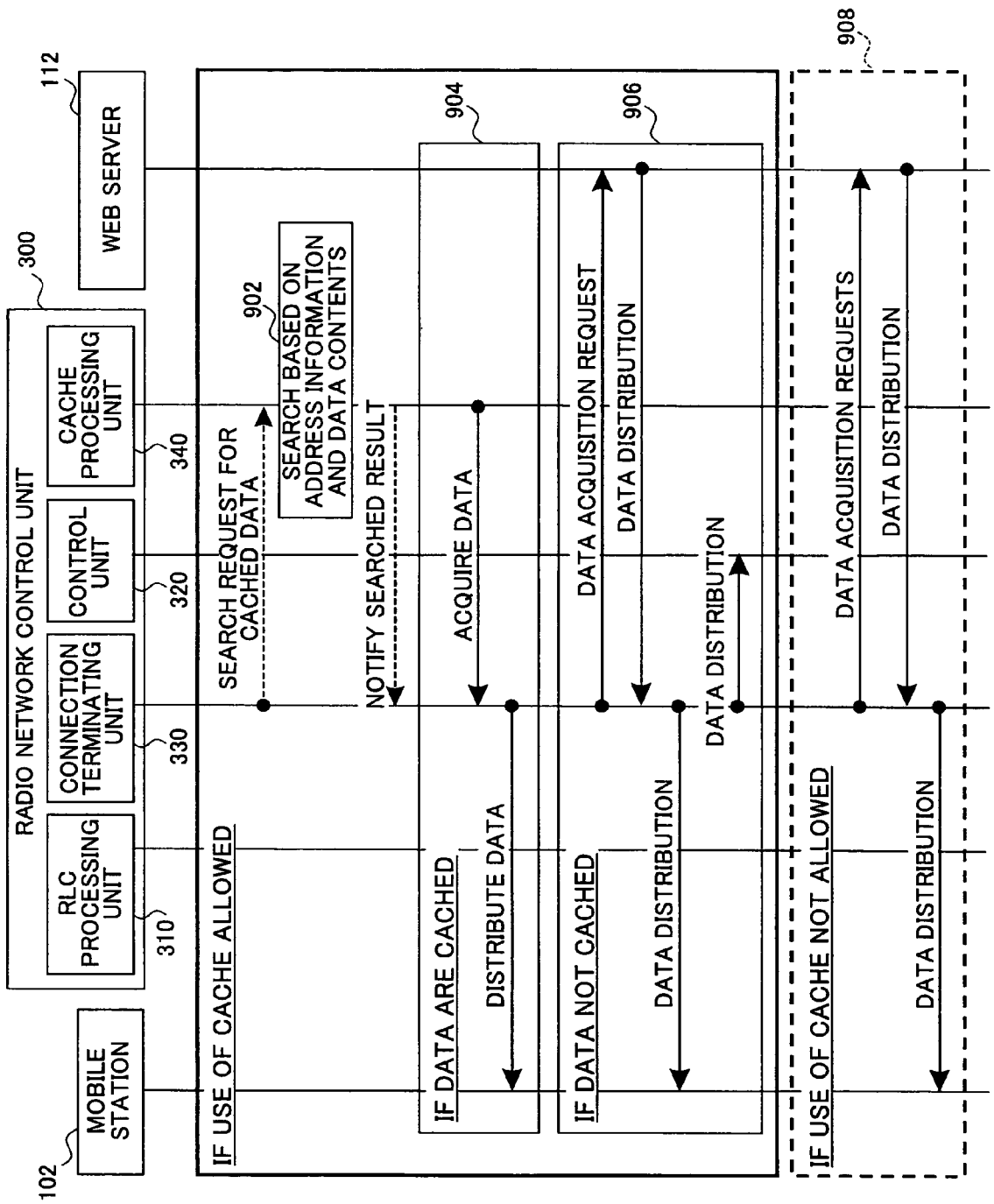
FIG. 9 is a sequence flowchart (No. 2) showing the operations according to the embodiment of the present invention.
Figure 10A:
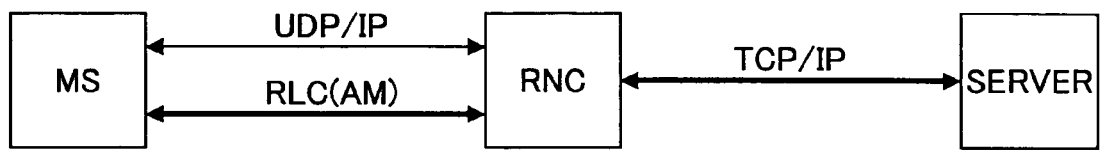
FIG. 10 gives block diagrams showing operation modes of a resending control according to the embodiment of the present invention.
Figure 10B:
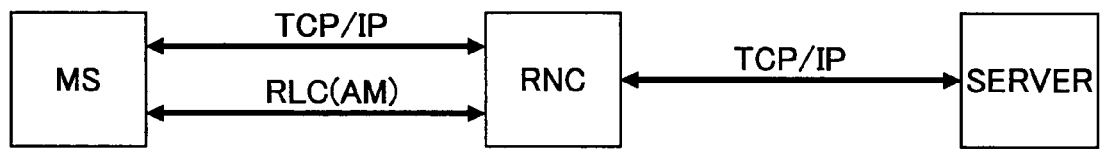
Figure 10C:
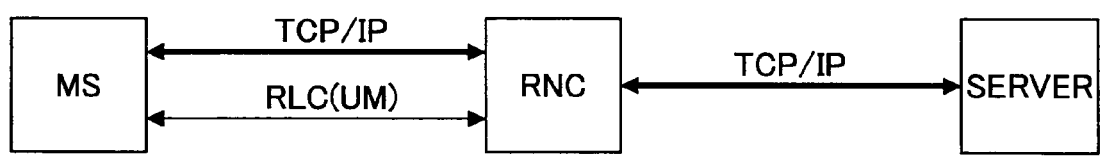
Figure 10D:
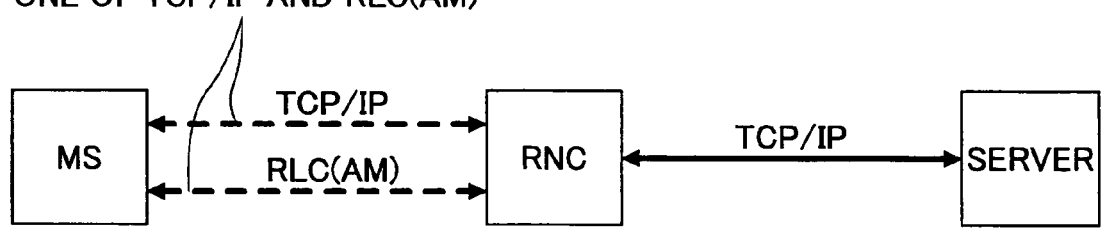

At Step 902 of FIG. 9, it is distinguished whether the data for reference are stored in the data storage unit 342 in the cache processing unit 340. A reference result is reported to the mobile station side terminating unit 332 of the connection terminating unit 330. When the data for reference exist, processing in Step 904 is performed.

At Step 904, the mobile station side terminating unit 332 of the connection terminating unit 330 extracts the data for reference, and sends the data to the RLC processing unit 310, and the data are transmitted toward the mobile station 102. In Step 902, when the data for reference do not exist, processing in Step 906 is performed.

At Step 906, the data acquisition request transmitted to the mobile station side terminating unit 332 in the connection terminating unit 330 is transmitted to the network side terminating unit 334, and is transmitted to the Web server 12 through the Iu interface unit 350. According to this data acquisition request, the Web server 112 returns the requested data. The network side terminating unit 334 of the connection terminating unit 330 transmits the requested data to the mobile station side terminating unit 332, when the data from the Web server 112 are received. Henceforth, the acquired data are transmitted to the mobile station 102 through the RLC processing unit 310 and the Iub interface unit 302. On the other hand, the network side terminating unit 334 sends the data received from the Web server 112 to the data control unit 344. The data control unit 344 stores the received data in the data storage unit 342. In this case, the storing operation may be performed under the direction of the control unit 320. For example, when the data received from the web server are of the secret nature, the data should not be stored at all. Alternatively, the secret data may be once stored in the data storage unit 342, wherein access to the secret data is controlled by the contents of the directions of the control unit 320 (for example, privileged access may be set up).

In addition, although FIG. 9 shows the case wherein the data cache is performed after the connection terminating unit 330 distributes data to the mobile station 102, the sequence may be reverse, or simultaneous.

Step 908 is performed when it is determined the data are not to be cached at Step 814. The data acquisition request transmitted to the mobile station side terminating unit 332 of the connection terminating unit 330 is transmitted to the network side terminating unit 334, and is transmitted to the Web server through the Iu interface unit 350. In response to the data acquisition request, the Web server 112 returns the requested data. When the data from the Web server 112 are received, the network side terminating unit 334 of the connection terminating unit 330 transmits the data to the mobile station side terminating unit 332. Henceforth, the acquired data are transmitted to the mobile station 102 through the RLC processing unit 310 and the Iub interface unit 302. Unlike the case of Step 906, the data received from the Web server 112 in this case are not cached.

In this manner, according to the embodiment, a suitable data cache function is provided to the radio communications system.

Embodiment 2

As described above, resending control is performed such that data transmission is assured in the RLC connection and the TCP/IP connection. Generally, the data resent through an RLC connection is small, and a resending process is comparatively complicated in order that the amount of resource required in resending the data in a radio link can be as little as possible. The data size resent through the TCP/IP connection, on the other hand, is comparatively large, and the resending process is comparatively simple. Accordingly, in the case of the communication system of a protocol stack as shown in FIG. 7, several controlling methods can be considered.

FIG. 10 shows possible combinations (A) through (D) of communication protocols applicable between the mobile station (MS), the radio network control unit (RNC), and the Web server. Thick lines in FIG. 10 indicate communications to which a resending control is performed, and thin lines indicate communications to which the resending control is not performed. Dashed lines at (D) of FIG. 10 indicate that resending control is performed on either or both sides as described below. At (A) of FIG. 10, AM mode is set up to the RLC connection of a section between the mobile station (MS) and the radio network control unit (RNC), and UDP/IP mode is set up to the IP connection of the same section. The IP connection between the radio network control unit (RNC) and the Web server is a TCP/IP connection, and this is common to all the communications shown at (A) through (D) of FIG. 10. Therefore, the resending controlling method between the mobile station (MS) and the radio network control unit (RNC) is explained below.

Resending control of data is performed by the RLC connection and the TCP/IP connection in the case of (A) in FIG. 10. The function of resending control is not supported by the UDP/IP connection. In resending by the RLC protocol, the data size of resending is small and the transmission efficiency of data is high. Therefore, an error rate is high and it is desirable to perform resending control such as shown at (A) of FIG. 10 in the case that the communication bandwidth (resource) is restricted.

In the example shown at (B) of FIG. 10, AM mode is set up to the RLC connection for a section between the mobile station (MS) and the radio network control unit (RNC), and TCP/IP mode is set up to the IP connection for the same section. In this example, resending of data in small units is carried out by the RLC protocol between the mobile station (MS) and he radio network control units (RNC), and in addition, resending of data in large units is carried out by the TCP/IP protocol. In this manner, according to this example, two resending controls are performed with different data unit sizes, and different resending processes. Accordingly, communication reliability is raised. This example is especially desirable where the communication environment is poor and the error rate is high.

In the example shown at (C) of FIG. 10, UM mode is set up to the RLC connection for a section between the mobile station (MS) and the radio network control unit (RNC), and TCP/IP mode is set up to the IP connection for the same section. In this example, resending control by the RLC protocol is not performed, but resending control is exclusively performed by the TCP/IP protocol. Where the communication environment is favorable with a small error rate, it is advantageous for the TCP/IP protocol to exclusively perform the resending control, rather than additionally performing the resending control by the RLC protocol that requires the complicated control process.

Suppose that the communications between the mobile station and the base station (not shown in FIG. 10) is performed by, for example, the high-speed down link packet access (HSDPA) method. In this case, a resending control protocol (called HARQ, a hybrid automatic repeat request) is used, between the mobile station and the base station such that reliable data communications are provided. Consequently, from the viewpoint of the radio network control unit (RNC), it appears that the communication environment is favorable with a low error rate. In this case, between the base station and the radio network control unit (RNC), it is desirable to adopt the TCP/IP protocol that is a simple resending control.

In the example shown at (D) of FIG. 10, one of the AM mode and the UM mode is set up to the RLC connection to a section between the mobile station (MS) and the radio network control unit (RNC), and the TCP/IP mode is set up to IP connection for the same section. In this example, one of the methods shown at (B) and shown at (C) of FIG. 10 is used according to the communication environment. If the communication environment is favorable, the RLC connection uses the UM mode, and the resending control is carried out by the TCP/IP protocol as shown at (C) of FIG. 10. On the other hand, if the communication environment is poor, the RLC connection is in the AM mode, and the resending control is by the TCP/IP protocol. In this manner, suitable resending control is performed according to the communication environment.

Further, the present invention is not limited to these embodiments, but variations and modifications may be made without departing from the scope of the present invention.

The present application is based on Japanese Priority Application No. 2004-343350 filed on Nov. 29, 2004 with the Japanese Patent Office, the entire contents of that is hereby incorporated by reference.

What is claimed is:

1. A data-cache apparatus, connectable between a mobile station and an external server, comprising:
 a data distinguishing unit to distinguish an attribute of data requested by the mobile station, wherein the attribute indicates whether the data is cache-able data,
 a cache memory that temporarily stores data provided to the mobile station; and
 a data request processing unit to acquire the requested data from either the cache memory or the external server based on a result of the distinction made by the data distinguishing unit; wherein
 the data request processing unit performs operations of searching for the requested data in the cache memory, and storing the acquired data in the cache memory.

2. The data-cache apparatus as claimed in claim 1, wherein the cache memory stores only data having an attribute that matches a predetermined attribute indicating that the data is cache-able.

3. The data-cache apparatus as claimed in claim 2, wherein the predetermined attribute is assigned when setting up a Radio Link Control (RLC) communication with the mobile station.

4. The data-cache apparatus as claimed in claim 1, wherein the data request processing unit acquires the requested data from one of the cache memory and the external server in a TCP/IP layer.

5. The data-cache apparatus as claimed in claim 1, wherein the data distinguishing unit distinguishes
 the attribute of the data is carried out in a Radio Link Control (RLC) layer.

6. The data-cache apparatus as claimed in claim 1, wherein the data request processing unit comprises a control unit configured to manage resending of data between the mobile station and the data-cache apparatus a Radio Link Control (RLC) layer, a TCP/IP layer, or both.

7. The data-cache apparatus as claimed in claim 6, wherein the control unit is further configured to manage resending of data between the mobile station and the data-cache apparatus in the Radio Link Control (RLC) layer, the TCP/IP layer, or both, according to an error rate.

8. The data-cache apparatus as claimed in claim 6, wherein the control unit is further configured to manage resending of data between the mobile station and the data-cache apparatus in the Radio Link Control (RLC) layer, the TCP/IP layer, or both, according to a radio-communications environment.

9. The data-cache apparatus as claimed in claim 1, wherein the data request processing unit includes a communication condition management unit that manages service classification and logical channels that are set up when a communication connection between the mobile station and the data-cache apparatus is established.

10. The data-cache apparatus as claimed in claim 9, wherein
 the service classification and the logical channels are set up by a plurality of logical channels used by a Radio Link Control (RLC) protocol entity.

11. The data-cache apparatus as claimed in claim 1, wherein
 the data-cache apparatus is provided within a radio network control unit.

12. A radio network controlling method implemented in a radio control network that is connectable between a mobile station and an external server, the method comprising:
 a step of distinguishing an attribute of data requested by a mobile station, wherein the attribute indicates whether the data is cache-able data;
 a step of searching for the data requested by the mobile station in a cache memory, if the attribute matches a predetermined attribute that indicates that the data is cache-able, the cache memory storing data that have been provided to the mobile station;
 a step of acquiring the requested data from the external server if the attribute does not match the predetermined attribute that indicates that the data is cache-able, or if the requested data are not found in the cache memory; and
 a step of providing the data acquired either from the cache memory or the external server to the mobile station.

* * * * *